United States Patent
Aslan et al.

(10) Patent No.: US 7,082,377 B1
(45) Date of Patent: Jul. 25, 2006

(54) APPARATUS FOR ERROR CANCELLATION FOR DUAL DIODE REMOTE TEMPERATURE SENSORS

(75) Inventors: Mehmet Aslan, Sunnyvale, CA (US); Qing Feng Ren, San Jose, CA (US); Richard Henderson, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/792,112

(22) Filed: Mar. 3, 2004

(51) Int. Cl.
*G06F 15/00* (2006.01)
*G01K 7/00* (2006.01)
*H01L 35/00* (2006.01)

(52) U.S. Cl. .................. 702/130; 327/512; 374/178
(58) Field of Classification Search .................. 702/63, 702/99, 107, 127, 130; 374/43, 45, 110, 374/137, 142, 170, 178, 179, 181, 183; 327/100, 327/512

See application file for complete search history.

(56) References Cited

U.S. PATENT DOCUMENTS 6,008,685 A * 12/1999 Kunst .................. 327/512
6,149,299 A    11/2000 Aslan et al.
6,612,738 B1 *  9/2003 Beer et al. .................. 374/183

* cited by examiner

*Primary Examiner*—John Barlow
*Assistant Examiner*—John Le
(74) *Attorney, Agent, or Firm*—Darby & Darby, P.C.; Matthew M. Gaffney (57) ABSTRACT

A temperature measurement circuit for a dual junction temperature sensor is provided. The temperature measurement circuit is configured to provide separate bias currents to the junctions in the temperature sensor. The temperature measurement circuit includes two signal channels configured to provide an intermediate differential signal from a differential input signal that is received from the temperature sensor. Also, the temperature measurement circuit may include one or more multiplexer circuits that are configured to control the intermediate differential signal. The temperature sensor circuit further includes a control circuit configured to adjust the bias currents and to control the multiplexer circuits such that several different differential voltages can be provided by the signal channels. Additionally, the temperature measurement circuit includes a conversion circuit that is configured to convert the differential voltage to a temperature signal, and to perform error cancellation based on the different differential voltages provided by the signal channels.

24 Claims, 6 Drawing Sheets

APPARATUS FOR ERROR CANCELLATION FOR DUAL DIODE REMOTE TEMPERATURE SENSORS

FIELD OF THE INVENTION

The invention is related to error correction, and in particular, to an apparatus for canceling particular mismatches for a dual diode remote temperature sensor.

BACKGROUND OF THE INVENTION

Temperature measurements can be made by applying a current to a forward-biased PN junction and measuring the resulting potential across the PN junction. Temperature calculations can be made by determining the voltage difference that results as a function of different applied currents across a PN junction, using differing areas of PN junctions to which a current is applied, or a combination of both.

BRIEF DESCRIPTION OF THE DRAWINGS

Non-limiting and non-exhaustive embodiments of the present invention are described with reference to the following drawings, in which.

DETAILED DESCRIPTION

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, and the meaning of "in" includes "in" and "on." The term "connected" means a direct electrical connection between the items connected, without any intermediate devices. The phrase "in one embodiment," as used herein does not necessarily refer to the same embodiment, although it may. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other signal.

Briefly stated, the invention is related to a temperature measurement circuit for a dual junction temperature sensor. The temperature measurement circuit is configured to provide separate bias currents to the junctions in the temperature sensor. The temperature measurement circuit includes two signal channels configured to provide an intermediate differential signal from a differential input signal that is received from the temperature sensor. Also, the temperature measurement circuit may include one or more multiplexer circuits that are configured to control the intermediate differential signal. The temperature sensor circuit further includes a control circuit configured to adjust the bias currents and to control the multiplexer circuits such that several different differential voltages can be provided by the signal channels. Additionally, the temperature measurement circuit includes a conversion circuit that is configured to convert the differential voltage to a temperature signal, and to perform error cancellation based on the different differential voltages provided by the signal channels.

Figure 1:
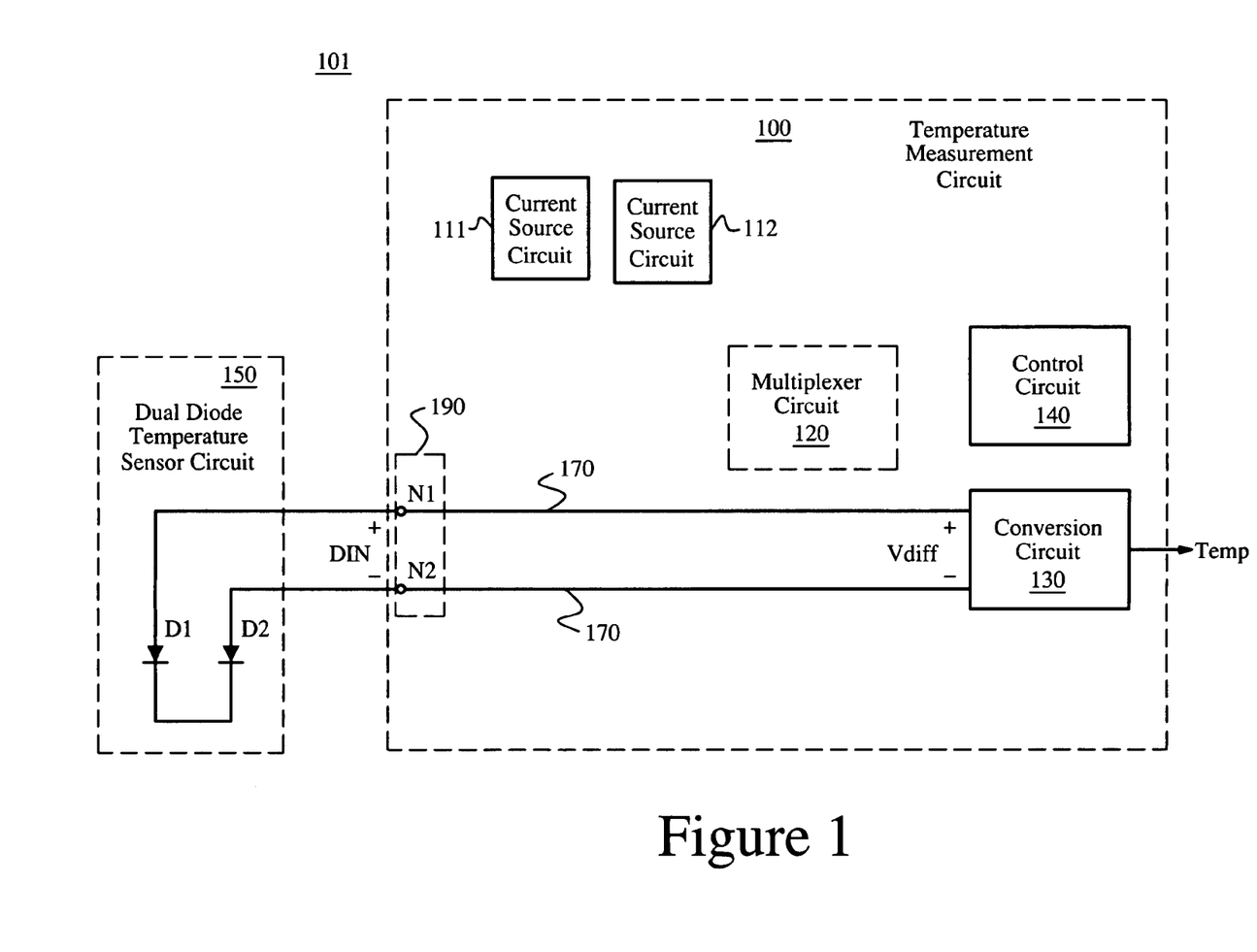
FIG. 1 illustrates a block diagram of components of an embodiment of a temperature sensor system.

FIG. 1 illustrates a block diagram of components of an embodiment of temperature sensor system 101. System 101 includes dual diode temperature sensor circuit 150 and temperature measurement circuit 100. Temperature measurement circuit 100 may include two signal channels 170, current source circuits 111–112, optional multiplexer circuit 120, conversion circuit 130, and control circuit 140. Also, temperature sensor circuit 150 includes PN junction D1 and PN junction D2.

Temperature sensor circuit 150 may be used to sense the temperature of an integrated circuit chip, or a device formed on the chip. Temperature sensor circuit 150 may be used to sense, for example, the temperature of a microprocessor. Temperature sensor circuit 150 may be placed on the same substrate as the device whose temperature is being measured. Temperature measurement circuit 100 is on a different substrate than temperature sensor circuit 150. In one embodiment, the cathodes of PN junctions D1 and D2 are coupled to a ground terminal.

Current source circuits 111 and 112 are configured to provide respective bias currents I1 and I2 (not shown in FIG. 1) to sense nodes 190. In one embodiment, current sources 111 and 112 are coupled directly to signal channels 170. In another embodiment, multiplexer circuit 120 is coupled between current sources 111 and 112 and signal channels 170. Sense nodes 190 include sense nodes N1 and N2. Bias currents I1 and I2 (not shown in FIG. 1) forward-bias PN junctions D1 and D2. PN junctions D1 and D2 are configured to provide a differential input voltage (DIN) from bias currents I1 and I2 (not shown in FIG. 1).

Signal channels 170 are configured to receive signal DIN at sense nodes 190. Temperature measurement circuit 100 may be on an integrated chip, with input pins at sense nodes 190. Additionally, signal channels 170 are configured to provide a differential intermediate signal (Vdiff) from signal DIN. Further, multiplexer circuit 120 may be configured to control signal Vdiff. In one embodiment, multiplexer circuit 120 is configured to control the differential intermediate signal by multiplexing the two signal channels. In another embodiment, multiplexer circuit 120 is configured to control the differential intermediate signal by multiplexing which bias current is provided to which channel.

Control circuit 140 is configured to control signal Vdiff such that signal Vdiff is different at different times. In one embodiment, control circuit 140 is configured to control signal Vdiff by controlling multiplexer circuit 120. In one embodiment, control circuit 140 is configured to control signal Vdiff by adjusting the bias currents (I1 and I2) that are provided by current source circuits 111 and 112.

Conversion circuit 130 is configured to convert signal Vdiff into a digital temperature signal (Temp) that is associated with the temperature at temperature sensor 150. Temperature may be calculated according to the equation $T=q*Vdiff/(\eta*K*\ln(N))$, where T is the absolute temperature in Kelvin, q is the charge of an electron, $\eta$ is the non-ideality factor of diodes D1 and D2, K is Boltzmann's constant, and N is the ratio of areas of D1 and D2. Also, a mathematical algorithm may be employed for error correction of signal Temp based on the different differential voltages Vdiff that result when control circuit 140 controls signal Vdiff. These calculations may be performed in the analog domain, the digital domain, or a combination of each. Although not shown in FIG. 1, conversion circuit 130 may include an ADC circuit, and additional circuitry for performing the calculations.

Figure 2:
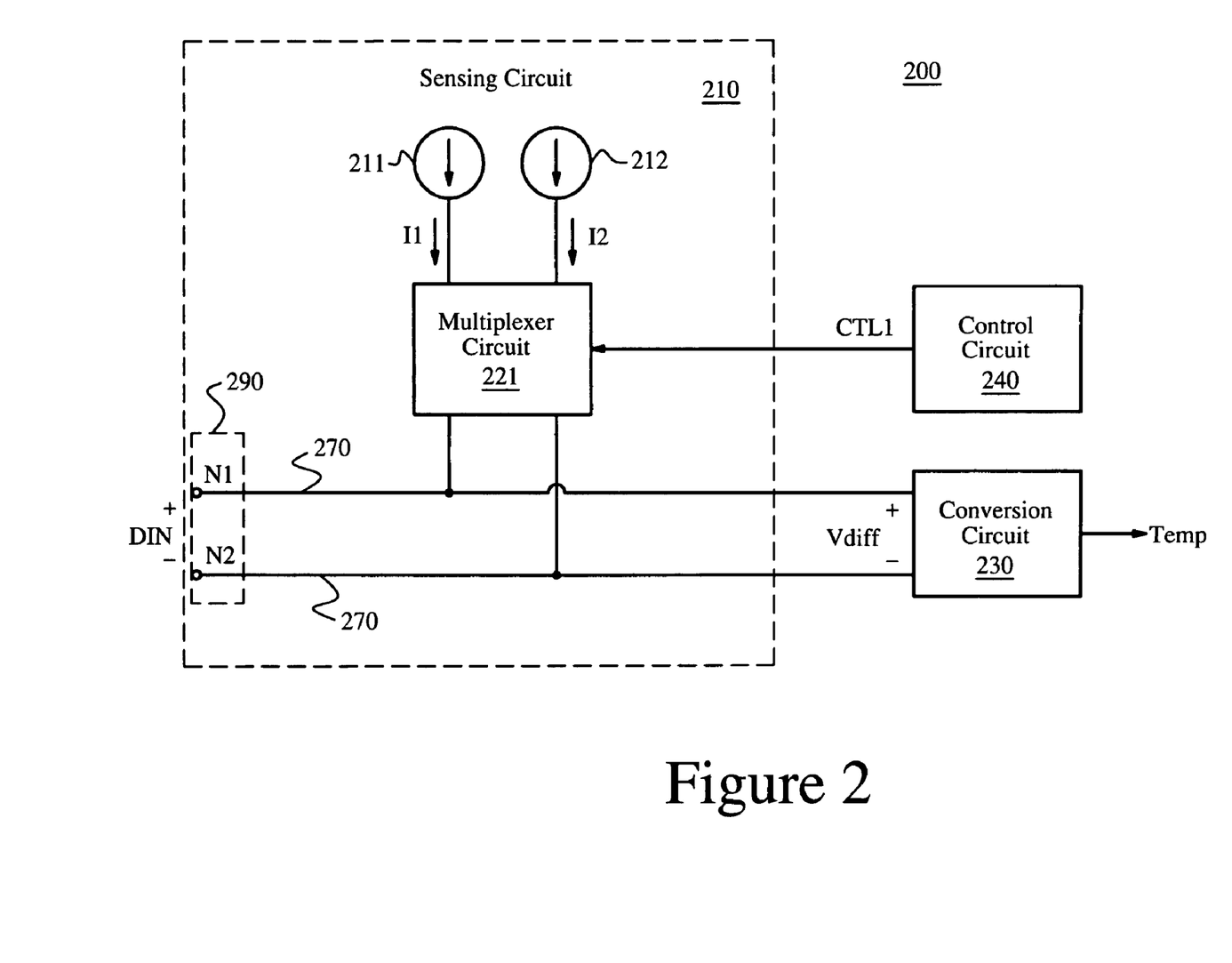
FIG. 2 shows a block diagram of an embodiment of the temperature measurement circuit of FIG. 1.

FIG. 2 shows a block diagram of an embodiment of temperature measurement circuit 200. Temperature measurement circuit 200 includes sensing circuit 210, conversion circuit 230, and control circuit 240. Sensing circuit 210 may include currents sources 211 and 212, multiplexer circuit 221, and signal channels 270.

Components in temperature measurement circuit 200 may operate in a substantially similar manner as similarly-named components in temperature measurement circuit 100, albeit in a different manner in some ways. Multiplexer circuit 221 is configured to control, responsive to signal CTL1, which of bias currents I1 and I2 is provided to which of the sense nodes N1 and N2. Also, control circuit 240 is configured to provide signal CTL1 such that signal CTL1 corresponds to a first logic level at a first time, and a second logic level at a second time.

Conversion circuit 230 is configured to provide signal Temp from signal Vdiff at the first and second times such that a mismatch between currents I1 and I2 is substantially cancelled. In one embodiment, conversion circuit 230 is configured to substantially average the two differential voltages. The averaging may be performed in the analog domain, the digital domain, or a combination of each.

Figure 3:
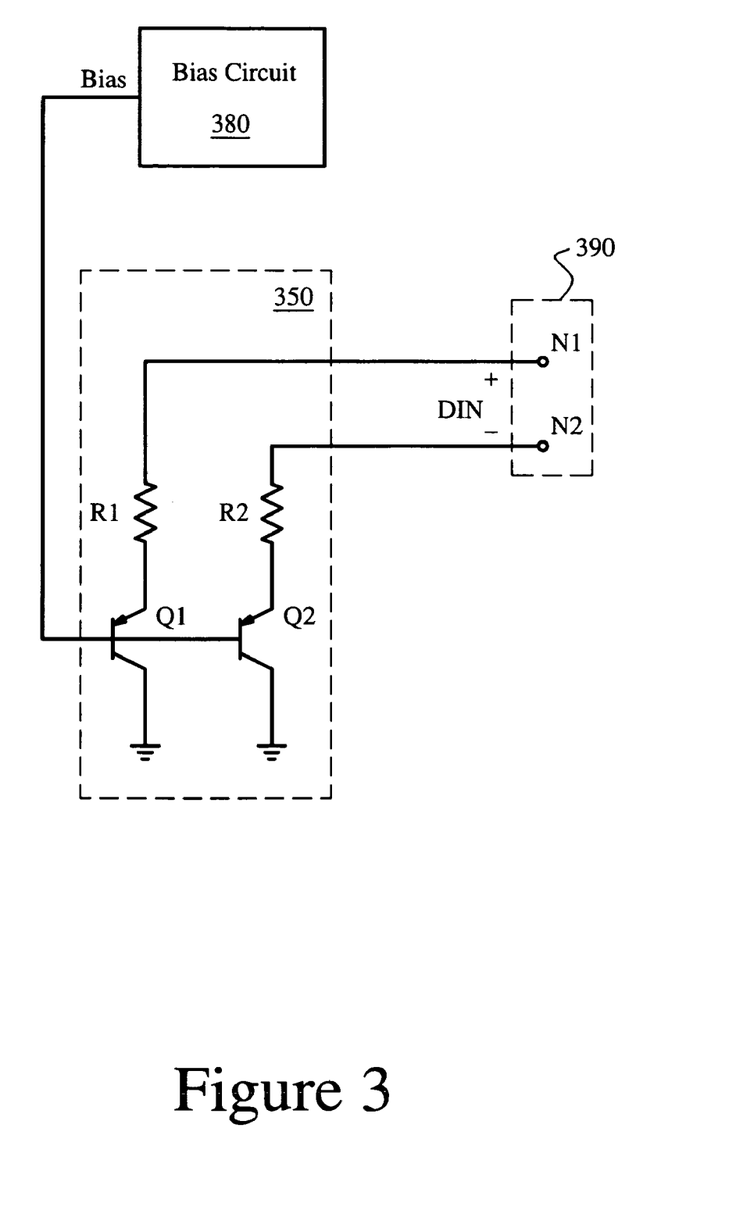
FIG. 3 schematically illustrates an embodiment of the dual diode temperature sensor circuit of FIG. 1.

FIG. 3 schematically illustrates an embodiment of dual diode temperature sensor circuit 350. Dual diode temperature sensor circuit 350 includes transistor Q1 and Q2.

FIG. 3 also shows a bias circuit 380 that is configured to provide a bias signal to the bases of transistors Q1 and Q2. Bias circuit 380 may be located on the same substrate as dual diode temperature sensor circuit 350, the same substrate as the temperature measurement circuit, a third substrate, and the like.

Temperature sensor 350 may operate in a substantially similar manner as temperature sensor circuit 150, albeit in a different manner in some ways. The base-emitter junction of transistors Q1 and Q2 are the two PN junctions of dual diode temperature sensor circuit 350. Parasitic resistances R1 and R2 also affect signal DIN. Although parasitic resistances R1 and R2 are shown within dual diode temperature circuit 350 in FIG. 3, parasitic resistances R1 and R2 may also include parasitic resistances associated with the signal lines between dual diode remote temperature circuits 130 and sense nodes 390.

Figure 4:
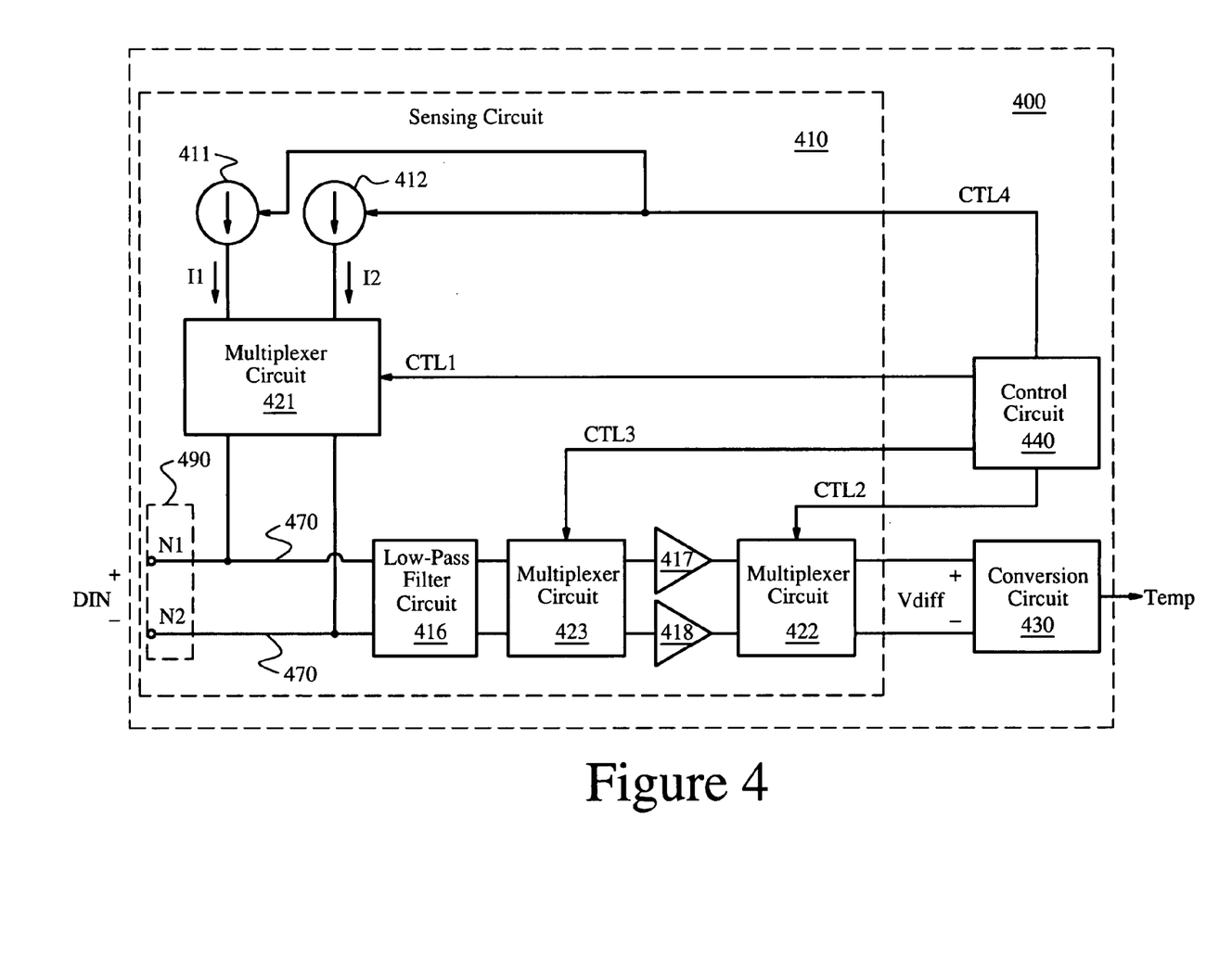
FIG. 4 illustrates a block diagram of an embodiment of the temperature measurement circuit of FIG. 2.

FIG. 4 illustrates a block diagram of an embodiment of temperature measurement circuit 400. Temperature measurement circuit 400 includes sensing circuit 410, control circuit 440, and conversion circuit 430. Sensing circuit 410 may include current source circuits 411–412, signal channels 470, multiplexer circuits 421–423, low-pass filter circuit 416, and buffer circuits 417–418.

Components in temperature measurement circuit 400 may operate in a substantially similar manner as similarly-named components in temperature measurement circuit 200, albeit in a different manner in some ways. Control circuit 440, multiplexer circuit 423, and conversion circuit 430 are arranged to substantially cancel offset voltage mismatch between buffer circuits 417 and 418. In one embodiment, signal Temp may be calculated based on the average of signal Vdiff when signal CTL3 corresponds to the first logic level, and further based on signal Vdiff when signal CTL3 corresponds to the second logic level.

Similarly, control circuit 440, multiplexer circuit 422, and conversion circuit 430 are arranged to substantially cancel an offset voltage associated with conversion circuit 430. In one embodiment, signal Temp may be calculated based on signal Vdiff when signal CTL2 corresponds to the first logic level, and based on signal Vdiff when signal CTL2 corresponds to the second logic level, by subtracting the latter from the former, and dividing the result by two.

The previously discussed means of error correction may be combined as follows. Signals CTL1, CTL2, and CTL3 may be viewed as a three-bit binary number from binary 000 to binary 111. Vdiff000 through Vdiff111 are used to represent signal Vdiff when signals CTL1–CTL3 corresponds to binary 000 through binary 111, respectively. Conversion circuit 430 may calculate a corrected value of Vdiff as (Vdiff000−Vdiff001−Vdiff010+Vdiff011+Vdiff100−Vdiff101−Vdiff110+Vdiff111)/8. This corrected value of signal Vdiff is substantially corrected for current mismatch between current I1 and I2, voltage offset mismatch between buffer circuit 417 and 418, and the offset voltage associated with conversion circuit 430.

In one embodiment, the addition and subtraction may be accomplished with a bi-directional counter. In one embodiment, division may be accomplished with a shift register. Many other means of making the calculations may be employed in other embodiments.

Control circuit 440 may be further configured to provide current control signal CTL4. Also, current source circuit 411 may be configured to provide current I1 such that current I1 is equal to a*I0 if signal CTL4 corresponds to a first logic level, and such that current I1 is equal to b*I0 is signal CTL4 corresponds to a second logic level. Additionally, current source circuit 412 may be substantially similar to current source circuit 411. Control circuit 440, current source circuits 411 and 412, and conversion circuit 430 are arranged to substantially cancel the resistance mismatch between parasitic resistances R1 and R2 (referring to FIG. 3). In one embodiment, the equation Vdiff_cor=(b*Vdiffa−a*Vdiffb)/(b−a) may be employed, where Vdiffa represents signal Vdiff when signal CTL4 corresponds to the first logic level, Vdiffb represents signal Vdiff when signal CTL4 corresponds to the second logic level, and Vdiff_cor represents the value of Vdiff corrected for the resistance mismatch between parasitic resistances R1 and R2. Other similar mathematical algorithms may also be employed to substantially correct the mismatch. The resistance mismatch error correction may be combined with one or more of the other error corrections previously discussed.

In one embodiment control circuit 440 is configured to provide signal CTL4 in a patterned order such as 0, 1, 1, 0, 0, 1, 1, 0, 0, and so on. This way the first set of bias currents may comprise the currents "1×" and "2×," while the second set of bias currents may comprise the currents "2×" and "1×." Using these example sets of currents, the "1×" current and the "2×" current are applied in turn during the first phase while voltage measurements are taken for each current. During the second phase, the "2×" and "1×" currents are applied in turn with voltage measurements being taken for each current. Thus, a pattern of "1× 2× 2× 1×" of bias currents is applied. The pattern has a midpoint that is substantially equidistant in time from when the first and the last elements in the pattern. The 2× current can be derived from 2 individual current source circuits, wherein each individual current source circuit supplies half of the 2× current.

Using each of the different individual current source circuits for the 1× element in a series of repeated patterns allows averaging of measurements that were made from different individual current source circuits. In one embodiment, each individual current source circuit (e.g., a 1× current source circuit) is used to collectively produce the larger value (e.g., a 2× current value). During each repeated pattern, a different individual current source circuit is applied as the smaller value (e.g., a 1× current value). Using each of the individual current source circuits for the smaller current value allows the errors produced by variations of the individual current source circuits to be minimized.

A measurement error may occur when calculating the temperature if the temperature has changed between measurements of the forward biased PN junction voltage corresponding to the "1×" and the "2×" current. When the second set of currents is in a reverse order, the errors that result from applying the second set of currents will tend to cancel the errors resulting from applying the first set of currents. As such, the errors from each set of currents will tend to offset one another, such that the accuracy of the temperature calculation is improved.

In one embodiment, b=2 and a=1. In this embodiment, the equation may be simplified to Vdiff_cor=2*Vdiffa−Vdiffb. In one embodiment, multiplication of Vdiffa by two may accomplished by converting the signal twice. In this embodiment, a pattern of "1× 2× 1× 1× 2× 1×" for the bias currents may be employed.

Many embodiments of temperature measurement circuit 400 are possible. In one embodiment, buffers 417 and 418 are omitted. If correction for buffer offset mismatch between buffers 417 and 418 is not desired, or if buffers 417 and 418 are omitted, signal CTL3 and multiplexer circuit 423 may be omitted. Buffer circuit 417 and buffer 418 may be desirable for improved accuracy if the temperature of a relatively high speed processor is being measured, since the temperature may change quickly. For some applications, however, buffer circuits 417 and 418 may not be needed.

If correction for the offset voltage of conversion circuit 430 is not desired, or if some other means of correcting it is employed, then multiplexer circuit 422 and signal CTL2 may be omitted. Similarly, if correction for the mismatch between bias currents I1 and I2 is not desired or needed, multiplexer circuit CTL1 and multiplexer circuit 421 may be omitted. Additionally, if correction for a resistance mismatch in the temperature sensor circuit is not desired or needed, signal CTL4 may be omitted, and current source circuits 411 and 412 need not be adjustable in the manner previously described. Also, different mathematical methods of determining the corrected Vdiff than those previously discussed may be employed.

Figure 5:
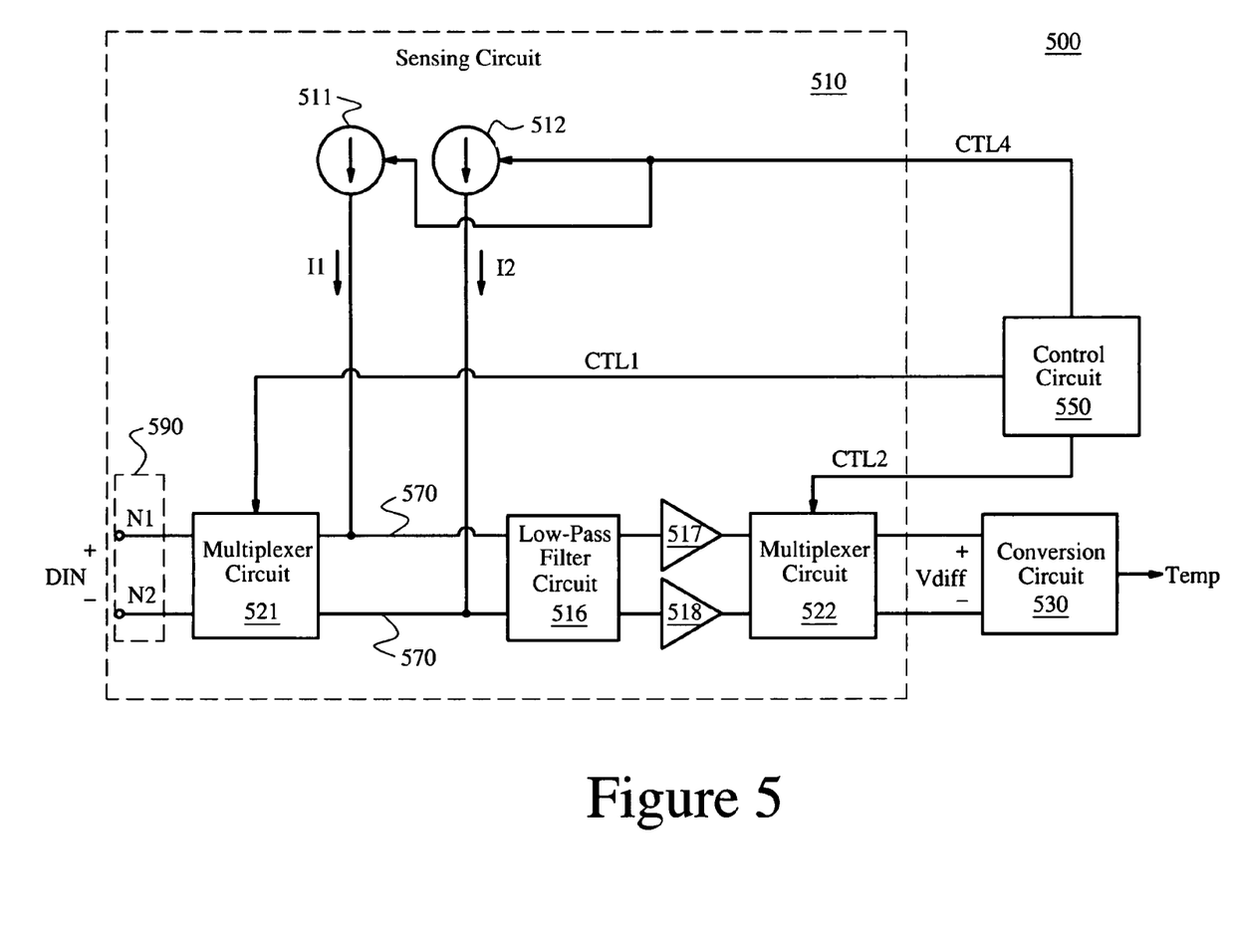
FIG. 5 shows a block diagram of another embodiment of the temperature measurement circuit of FIG. 2.

FIG. 5 shows a block diagram of an embodiment of temperature measurement circuit 500. Components in temperature measurement circuit 500 may operate in a substantially similar manner as similarly-named components in temperature measurement circuit 400, albeit in a different manner in some ways. In circuit 500, a single multiplexer circuit 521 replaces multiplexer circuit 421 and 423. Multiplexer circuit 521 is configured to perform error correction for both the current mismatch between current I1 and I2, and the voltage mismatch between buffer circuits 517 and 518.

Virtually any ADC circuit may be used in conversion circuit 430 or conversion circuit 530. In one embodiment, a sigma-delta ADC circuit may be used, as discussed in greater detail with regard to FIG. 6 below.

Figure 6:
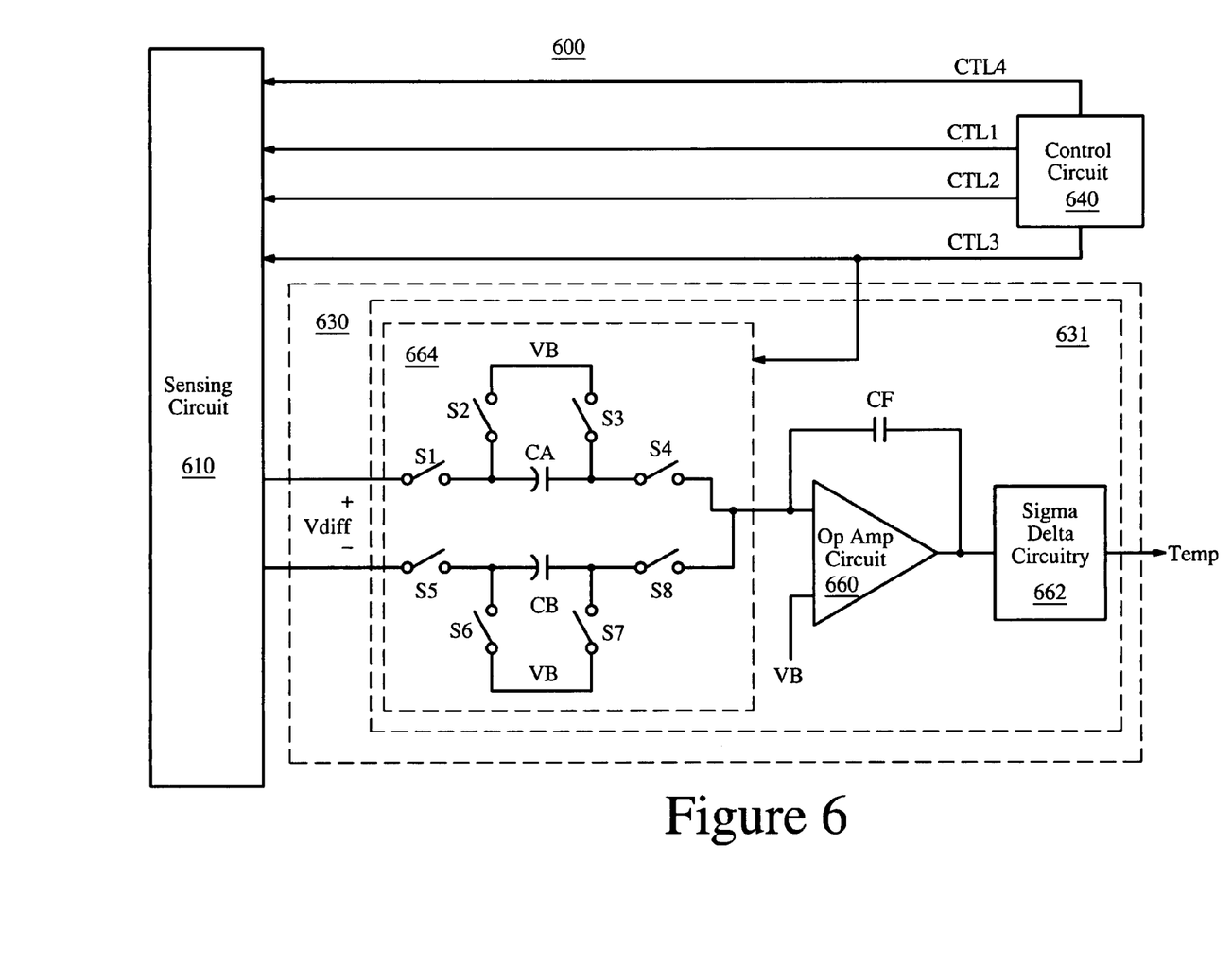
FIG. 6 illustrates a block diagram of an embodiment of the temperature measurement circuit of FIG. 2 in which a sigma-delta analog-to-digital converter (ADC) is employed, arranged in accordance with aspects of the present invention.

FIG. 6 illustrates a block diagram of an embodiment of temperature measurement circuit 600, in which sigma-delta ADC circuit 631 is employed. Circuit 600 includes sensing circuit 610, control circuit 640, and conversion circuit 630. Conversion circuit 630 includes sigma-delta ADC circuit 631. Sigma-delta ADC circuit 631 includes operational amplifier circuit 660, capacitor CF, switched capacitor circuit 664, and sigma-delta circuitry 662. Additionally, switched capacitor circuit 664 includes capacitors CA and CB, and switches S1–S8.

Components in temperature measurement circuit 600 may operate in a substantially similar manner as similarly-named components in temperature measurement circuit 400, albeit in a different manner in some ways. Signal CTL3 may also be employed to substantially cancel mismatch between capacitors CA and CB. If signal CTL3 corresponds to the first logic level, then capacitor CA is used as an integrator with positive gain, and capacitor CB is used as an integrator with negative gain. If signal CTL3 corresponds to the second logic level, then capacitor CA is used as an integrator with negative gain, and capacitor CB is used as an integrator with positive gain.

If signal CTL3 corresponds to the first logic level, then switches S2, S4, S5, and S8 are opened during a first phase, and the switches S1, S3, S6, and S7 are closed during the first phase, and the switching is reversed during a second phase.

If signal CTL3 corresponds to the second logic level, then switches S1, S4, S6, and S8 are opened during the first phase, and switches S2, S3, S5, and S7 are closed during the first phase, and the switching is reversed during the second phase.

Although not shown, another control signal, CTL5, may be used in place of signal CTL3 to control the switching in switched capacitor circuit 664.

The capacitance mismatch error correction may be combined with one or more of the other error corrections previously discussed.

As discussed previously, the calculations may be performed in the analog domain, the digital domain, or a mixture of both. One example of performing the calculations in a mixed domain may be performed as follows.

2Vdiffa−Vdiffb may be expressed as: 2Vdiffa−Vdiffb=2*Da−Db+(2*Ea−Eb), where Da is the digital output when Vdiffa is the input, Db is the digital output when signal Vdiffb is the input, Ea is the quantization error of Da, and Eb is the quantization error of Db. Accordingly, 2Vdiffa−Vdiffb may be calculated in the mixed domain by calculating the first term in the digital domain, and calculating the second term in the analog domain. Operational amplifier circuit 660 has the quantization error at its output. Accordingly, by not resetting operational amplifier circuit 660, the analog calculation is automatically performed by operational amplifier circuit 660.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A temperature measurement circuit, comprising:
   two signal channels that are configured to receive, at first and second sense nodes, a differential input signal from a dual junction temperature sensor circuit, and further configured to provide a differential intermediate signal from the differential input signal;
   two current source circuits configured to provide respective bias currents to the first and second sense nodes;
   a conversion circuit that is configured to convert the differential intermediate signal into a digital temperature signal that is associated with a remote temperature; and
   a first multiplexer circuit that is configured to control the differential intermediate signal.

2. The temperature measurement circuit of claim 1, wherein the conversion circuit includes a sigma-delta analog-to-digital converter circuit, and wherein the sigma-delta analog-to-digital converter circuit includes:
   an operational amplifier circuit; and
   a switched capacitor circuit that is responsive to a control signal, wherein the switched capacitor includes first and second capacitors, and wherein:
   if the control signal corresponds to the first logic level:
      the first capacitor is configured to operate as an integrator with positive gain, and the second capacitor is configured to operate as an integrator with negative gain; and
   if the control signal corresponds to the second logic level:
      the first capacitor is configured to operate as an integrator with negative gain, and the second capacitor is configured to operate as an integrator with positive gain.

3. The temperature measurement circuit of claim 1, wherein the first multiplexer circuit is configured to control the differential intermediate signal by multiplexing the two signal channels.

4. The temperature measurement circuit of claim 1, wherein the multiplexer circuit is configured to control the differential intermediate signal by multiplexing which one of the bias currents is provided to which one of the two signal channels.

5. The circuit of claim 1, wherein the conversion circuit is configured to provide the digital temperature signal such that the remote temperature is calculated based on a voltage difference between the two pn junctions in the dual junction temperature sensor.

6. A temperature measurement circuit, comprising:
   two signal channels that are configured to receive, at first and second sense nodes, a differential input signal from a dual junction temperature sensor circuit, and further configured to provide a differential intermediate signal from the differential input signal;
   two current source circuits configured to provide respective bias currents to the first and second sense nodes;
   a conversion circuit that is configured to convert the differential intermediate signal into a digital temperature signal that is associated with a remote temperature;
   a first multiplexer circuit that is configured to control the differential intermediate signal, wherein the first multiplexer circuit is configured to control the differential intermediate signal by multiplexing the two signal channels;
   a first buffer circuit coupled between the first multiplexer circuit and the first sense node;
   a second buffer circuit coupled between the first multiplexer circuit and the second sense node; and
   another multiplexer circuit that is coupled between the first and second sense nodes and the first and second buffer circuits.

7. A temperature measurement circuit, comprising:
   two signal channels that are configured to receive, at first and second sense nodes, a differential input signal from a dual junction temperature sensor circuit, and further configured to provide a differential intermediate signal from the differential input signal;
   two current source circuits configured to provide respective bias currents to the first and second sense nodes;
   a conversion circuit that is configured to convert the differential intermediate signal into a digital temperature signal that is associated with a remote temperature;
   a first multiplexer circuit that is configured to control the differential intermediate signal, wherein the multiplexer circuit is configured to control the differential intermediate signal by multiplexing which one of the bias currents is provided to which one of the two signal channels; and
   a control circuit that is configured to provide a first control signal such that the first control signal corresponds to a first logic level at a first time, and a second logic level at a second time, wherein the first multiplexer circuit is configured to receive a first control signal, and wherein the first multiplexer circuit is arranged such that multiplexing which one of the bias currents is provided to which one of the two signal channels is selected according to the first control signal, and wherein the differential intermediate signal includes a first differential voltage at the first time, and a second differential voltage at the second time.

8. The temperature measurement circuit of claim 7, wherein the conversion circuit is configured to provide the digital temperature signal such that the digital temperature signal is derived from an average of the first differential voltage and the second differential voltage.

9. The temperature measurement circuit of claim 7, further comprising:
   a second multiplexer circuit that is coupled between the first and second sense nodes and the conversion circuit, wherein the second multiplexer circuit is responsive to a second control signal.

10. The temperature measurement circuit of claim 9, wherein the control circuit is configured to:
    provide the first control signal such that the first control signal corresponds to:
       the first logic level at a third time, and
       the second logic level at a fourth time, and
    provide the second control signal such that the second control signal corresponds to:
       the first logic level at the first and second times, and
       the second logic level at the third and fourth times.

11. The temperature measurement circuit of claim 10,
    wherein the differential intermediate signal includes a third differential voltage at the third time, and includes a fourth differential voltage at the fourth time, and wherein
    the conversion circuit is further configured to provide the digital temperature signal such that the digital temperature signal is associated with the first differential voltage plus the third differential voltage minus the second differential voltage minus the fourth differential voltage, all divided by four.

12. A temperature measurement circuit; comprising:
a control circuit that is configured to provide a current control signal;
a sensing circuit that is configured to receive, at first and second sense nodes, a differential input signal from a dual junction temperature sensor circuit, and further configured to provide a differential intermediate signal from the differential input signal, wherein the sensing circuit includes:
a first current source circuit that is configured to provide a first bias current, wherein the first bias current corresponds to one of a first value if the current control signal corresponds to a deasserted value, and corresponds to a second value if the current control signal corresponds to an asserted value;
a second current source circuit that is configured to provide a second bias current such that the second bias current corresponds to a third value if the current control signal corresponds to the deasserted value, and corresponds to a fourth value if the current control signal corresponds to an asserted value, wherein the differential intermediate signal includes a differential voltage that depends at least in part on the current control signal; and
a conversion circuit that is configured to convert the differential intermediate signal into a digital temperature signal that is associated with a remote temperature.

13. The temperature measurement circuit of claim 12, wherein the conversion circuit includes a sigma-delta analog-to-digital converter circuit, and wherein the sigma-delta analog-to-digital converter circuit includes:
an operational amplifier circuit that is configured to receive an amplifier input signal; and
a switched capacitor circuit that is responsive to another control signal, wherein conversion circuit is configured to provide the amplifier input signal such that the amplifier input signal corresponds to a first voltage if the other control signal corresponds to a first logic level, and corresponds to a second voltage if the control signal corresponds to a second logic level, and wherein the conversion circuit is further configured to substantially cancel a capacitor mismatch in the switched capacitor circuit based on the first and second voltages.

14. The temperature measurement circuit of claim 12, wherein the conversion circuit is configured to substantially cancel effects of a resistance mismatch by deriving the digital temperature signal at least in part from:
the differential voltage when the current control signal is asserted,
the differential voltage when the current control signal is deasserted, and
a ratio b:a of the second value to the first value, wherein the second current source circuit is configured such that the ratio of the fourth value to the third value is approximately b:a.

15. The temperature measurement circuit of claim 14, wherein the conversion circuit is configured to derive the digital temperature signal by employing a mathematical algorithm, wherein the mathematical algorithm is (b*Vdiffa−a*Vdiffb)/(b*a), Vdiffa represents the differential voltage when the control signal is deasserted, Vdiffb represent the differential voltage when the control signal is asserted.

16. The circuit of claim 14, wherein the ratio of the second value to the first value is approximately two to one.

17. The temperature measurement circuit of claim 12, wherein the sensing circuit further includes:
a first multiplexer circuit that is configured to multiplex, responsive to a first control signal, which of the first and second current source circuits is coupled to which of the first and second sense nodes.

18. The temperature measurement circuit of claim 17, wherein the sensing circuit further includes:
a second multiplexer circuit that is coupled between the first and second sense nodes and the conversion circuit, wherein the second multiplexer circuit is responsive to a second control signal, and wherein the control circuit is further configured to provide the first and second control signals.

19. The temperature measurement circuit of claim 18, wherein the sensing circuit further includes:
a first buffer circuit that is coupled between the first sense node and the second multiplexer circuit; and
a second buffer circuit that is coupled between the second sense node and the second multiplexer circuit;
a third multiplexer circuit that is coupled between the first and second sense nodes and the first and second buffer circuits, wherein the third multiplexer circuit is responsive to a third control signal, and wherein the control circuit is configured to provide the third control signal.

20. The differential remote temperature circuit of claim 19, wherein the control circuit is arranged to provide the first, second, third, and current control signals such that the differential signal corresponds to each of sixteen different differential voltages at different times depending on the logic level of the first, second, third, and current control signals, and wherein the conversion circuit is configured to derive the digital temperature signal based on the sixteen different differential voltages.

21. A temperature measurement circuit, comprising:
means for providing a differential intermediate signal from a differential input signal, wherein the means for providing includes:
means for providing a first bias current; and
means for providing a second bias current;
means for converting the differential intermediate signal into a temperature signal that is related to a temperature of a remote device such that the temperature of the remote device is calculated based on a voltage difference between two pn junctions; and
means for substantially canceling at least one of:
at least one voltage offset that is included the means for providing;
at least one voltage offset that is included in the means for converting;
a capacitance mismatch that is included in the means for converting;
a resistance mismatch that is associated with the remote device;
another resistance mismatch that is associated with signals lines that are coupled between the remote device and the means for providing; or
a current mismatch between the first and second bias currents.

22. A temperature measurement circuit, comprising:
two signal channels that are configured to receive, at first and second sense nodes, a differential input signal from a dual junction temperature sensor circuit, and further configured to provide a differential intermediate signal from the differential input signal;

two current source circuits configured to provide respective bias currents to the first and second sense nodes;

a conversion circuit that is configured to convert the differential intermediate signal into a digital temperature signal that is associated with a remote temperature; and a first multiplexer circuit that is configured to control the differential intermediate signal, wherein the two signal channels are configured to receive the differential input signal from two separate pn junctions of the dual junction temperature sensor circuit, such that a first half of the differential input signal is provided from one of the two separate pn junctions, a second half of the differential input signal is provided from the other of the two separate pn junctions, and such that the differential input signal is based on a voltage difference between the two separate pn junctions.

23. A temperature measurement circuit, comprising:

two signal channels that are configured to receive, at first and second sense nodes, a differential input signal from a dual junction temperature sensor circuit, and further configured to provide a differential intermediate signal from the differential input signal;

two current source circuits configured to provide respective bias currents to the first and second sense nodes;

a conversion circuit that is configured to convert the differential intermediate signal into a digital temperature signal that is associated with a remote temperature; and a first multiplexer circuit that is configured to control the differential intermediate signal, wherein the multiplexer circuit is a two-by-two multiplexer circuit.

24. The temperature measurement circuit of claim 23, wherein the multiplexer circuit is configured to control the differential intermediate signal by multiplexing whether a first of the two bias currents is provided to a first of the two signal channels and a second of the two bias current is provided to a second of the two signal channels, or vice versa.

* * * * *